(12) United States Patent
Ho et al.

(10) Patent No.: US 6,551,805 B2
(45) Date of Patent: Apr. 22, 2003

(54) FERMENTATION METHOD FOR PRODUCING HIGH CONCENTRATION CARBON DIOXIDE PRODUCT

(75) Inventors: Chris Ka Kee Ho, Mississauga (CA); Dan Grunwald, Thornhill (CA)

(73) Assignee: Praxair, Inc., Danbury, CT (US)

( * ) Notice: Subject to any disclaimer, the term of this patent is extended or adjusted under 35 U.S.C. 154(b) by 0 days.

(21) Appl. No.: 10/114,278

(22) Filed: Apr. 3, 2002

(65) Prior Publication Data

US 2002/0115132 A1 Aug. 22, 2002

Related U.S. Application Data

(63) Continuation-in-part of application No. 09/501,586, filed on Feb. 10, 2000, now abandoned.

(51) Int. Cl.$^7$ ............................... B09B 3/00; C12P 2/00
(52) U.S. Cl. ..................................... 435/132; 435/262.5
(58) Field of Search ................................ 210/600, 601, 210/603; 435/132, 161, 162, 163, 243, 262.5, 267

(56) References Cited

U.S. PATENT DOCUMENTS

| | | | |
|---|---|---|---|
| 4,094,742 A | 6/1978 | Bellamy | 195/33 |
| 4,261,420 A | 4/1981 | Hitzman | 166/246 |
| 5,021,069 A | 6/1991 | Whellock et al. | 44/622 |
| 5,356,600 A | 10/1994 | Kiyonaga et al. | 422/234 |
| 5,798,254 A | 8/1998 | Cheng | 435/243 |
| 5,939,313 A | 8/1999 | Cheng | 435/289.1 |
| 5,985,652 A | 11/1999 | Cheng | 435/286.6 |

*Primary Examiner*—David M. Naff
*Assistant Examiner*—Deborah K. Ware
(74) *Attorney, Agent, or Firm*—Stanley Ktorides

(57) ABSTRACT

A method for producing carbon dioxide at a flow rate is disclosed. The method comprises several steps including the provision of an oxidant fluid to a fermentation broth, use of oxygen from the oxidant fluid to promote fermentation and microbial growth in a fermenter while producing carbon dioxide within the broth, passing a fermentation broth stream out from the fermenter, and then through a heat exchanger, and then back into the fermenter via a recirculation loop, bubbling carbon dioxide out therefrom the broth creating a gas mixture containing a carbon dioxide concentration of 97.5 mole percent and recovering the gas mixture as product carbon dioxide. The oxidant fluid is provided to the fermentation broth at a flow rate such that the amount of oxygen provided to the fermentation broth is not more than 5 weight percent of the total amount of carbon dioxide being produced. The oxidant fluid contains an oxygen concentration of at least 40 mole percent. The oxidant fluid may be provided to the broth downstream of the heat exchanger, and also can be provided in either the fermenter or in the recirculation loop. Also the oxygen is provided to the broth at a flow rate within the range of 0.0003 to 0.0015 vvm. Ethanol may also be produced during fermentation in addition to carbon dioxide. The carbon dioxide can be subjected to purification which may include distillation and/or solvent absorption.

19 Claims, 2 Drawing Sheets

FERMENTATION METHOD FOR PRODUCING HIGH CONCENTRATION CARBON DIOXIDE PRODUCT

This is a Continuation-in-Part of prior U.S. application Ser. No. 09/501,586 Filing Date: Feb. 10, 2000, now abandoned.

TECHNICAL FIELD

This invention relates generally to the production of carbon dioxide.

BACKGROUND ART

Carbon dioxide has a large number of uses. For example, carbon dioxide is used to carbonate beverages, to chill, freeze and package seafood, meat, poultry, baked goods, fruits and vegetables, and to extend the shelf-life of dairy products. It is an important environmental component in industrial waste and process water treatment as a replacement for sulfuric acid to control pH levels. Other uses included drinking water treatment, an environmentally-friendly pesticide and an atmosphere additive in greenhouses to improve the growth of vegetables.

Generally carbon dioxide is produced by purifying a waste or other stream which is a by-product of an organic or inorganic chemical process. The waste stream comprising the carbon dioxide may be condensed and then processed in a distillation column to produce the product grade carbon dioxide.

The higher is the concentration of carbon dioxide in the waste stream, the easier and less expensive is the final purification to produce commercially useable carbon dioxide and thus it is desirable to have the feed stream to a final product carbon dioxide facility to have as high a carbon dioxide concentration as possible. Indeed, it would be very desirable if the byproduct carbon dioxide containing fluid from the chemical process had a sufficiently high carbon dioxide concentration so that no further purification were necessary to produce commercially useable carbon dioxide.

Accordingly, it is an object of this invention to provide a method for producing carbon dioxide from a biological process wherein the concentration of the carbon dioxide produced is sufficiently high so as to reduce the level of, or eliminate the need for, further processing of the carbon dioxide product from the process in order to produce commercially useable carbon dioxide.

SUMMARY OF THE INVENTION

The above and other objects, which will become apparent to those skilled in the art upon a reading of this disclosure, are attained by the present invention which is:

A method for producing carbon dioxide comprising:

(A) providing to a fermentation broth comprising one or more carbonaceous species an oxidant fluid having an oxygen concentration of at least 40 mole percent at a flow rate such that the amount of oxygen provided to the fermentation broth is not more than 5 weight percent of the amount of carbon dioxide produced;

(B) employing oxygen from the oxidant fluid to promote microbial growth within the fermentation broth, carrying out fermentation within the fermentation broth, and producing carbon dioxide within the fermentation broth in a fermentation vessel;

(C) passing a fermentation broth stream out from the fermentation vessel, through a heat exchanger, and then back into the fermentation vessel in a recirculation loop;

(D) bubbling carbon dioxide out from the fermentation broth to form a gas mixture having a carbon dioxide concentration of at least 97.5 mole percent; and (E) recovering said gas mixture as product carbon dioxide.

As used herein the term "fermentation broth" means a liquid medium containing microbes and one or more carbonaceous species which could be metabolized and/or fermented by the microorganisms.

As used herein the term "fermentation" means a biochemical process carried out by microorganisms wherein carbon dioxide is produced.

DETAILED DESCRIPTION

The invention comprises the recognition that the concentration of carbon dioxide in the gas mixture bubbling out of a fermentation broth can be increased to very high levels, indeed to such levels that further processing is often not necessary to produce commercial grade carbon dioxide, if the concentration of the oxygen in the oxidant fluid provided to the fermentation broth is at a defined high level and if the flow rate of the oxidant fluid provided to the fermentation broth is limited so that the total amount of oxygen provided to the fermentation broth is not more than a defined upper limit.

Figure 1:
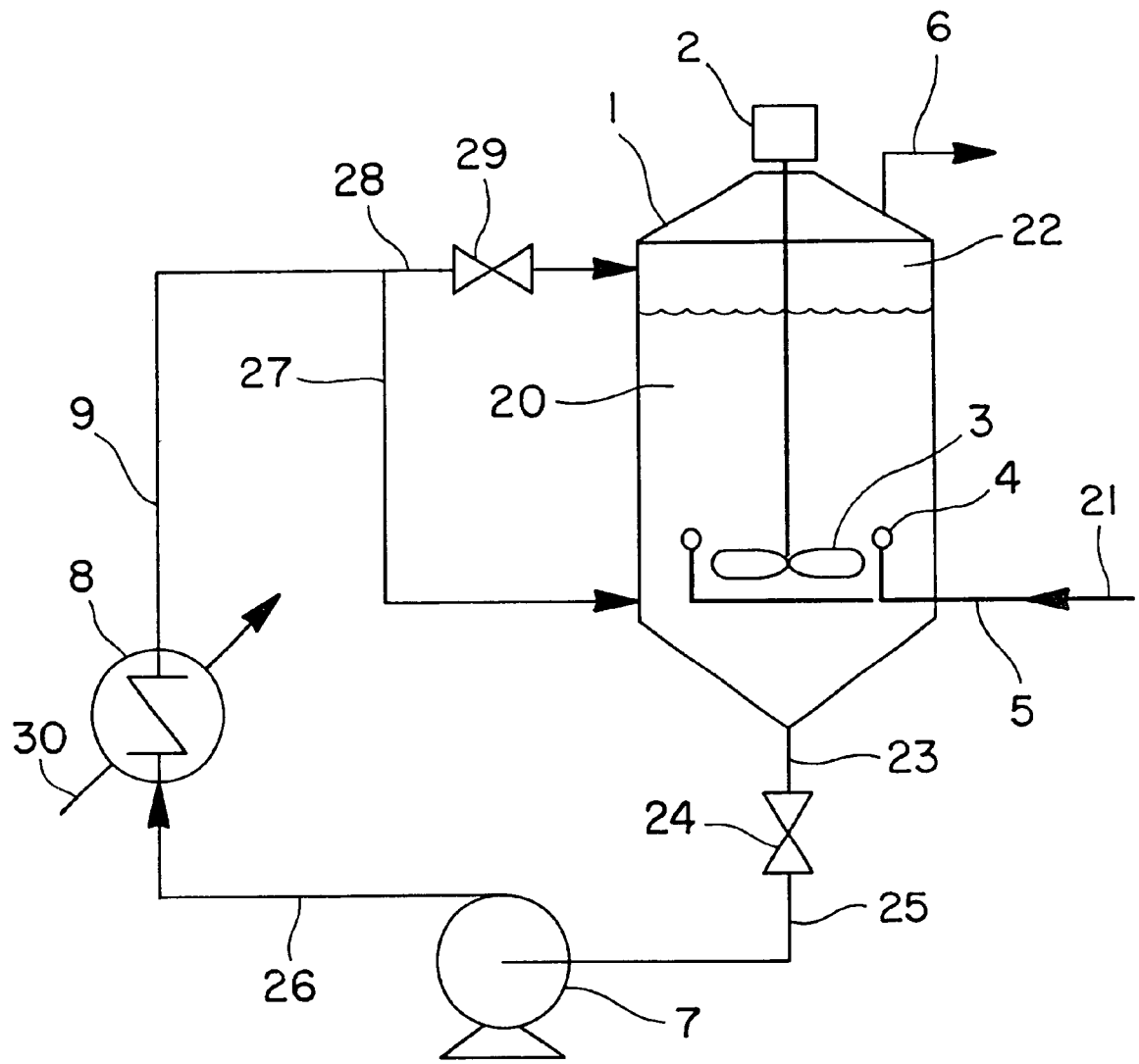
FIG. 1 is a simplified schematic representation of one preferred embodiment of the microbial growth and carbon dioxide production method of this invention.

The invention will be described in greater detail with reference to the Drawings. Referring now to FIG. 1, fermentation vessel 1 contains fermentation broth 20. Typically fermentation broth 20 comprises an aqueous mixture of carbohydrates such as sugars and microorganisms such as yeast for fermentation to produce ethanol. However this invention is not limited to ethanol fermentation. Any fermentation or microbial process wherein oxygen is used to sustain the growth of a microorganism and/or microbial or biochemical activity and wherein carbon dioxide is produced as a byproduct may be carried out in the practice of this invention.

Oxidant fluid 21 is provided to the fermentation broth through piping 5. The oxidant fluid has an oxygen concentration of at least 40 mole percent, preferably at least 80 mole percent, most preferably at least 90 mole percent. The oxidant fluid may, if desired, be commercially pure oxygen having an oxygen concentration of 99.5 mole percent or more. In the embodiment illustrated in FIG. 1, the oxidant fluid is provided to the fermentation broth while the fermentation broth is housed within vessel 1. The oxidant fluid passes from piping 5 through one or more fine bubble diffusers 4 and, as small bubbles, out into fermentation broth 20. Preferably substantially all of the oxygen provided to the fermentation broth with the oxidant fluid is dissolved in the fermentation broth. Oxygen from the oxidant fluid is used by the microorganisms or other oxygen consuming entity within broth 20 to carry out microbial growth and fermentation of various carbonaceous materials, e.g. carbohydrates, within broth 20 to produce carbon dioxide and, for example, ethanol. In the embodiment illustrated in FIG. 1 the oxidant fluid distribution is facilitated by stirring or mixing broth 20 by means of agitator 3 driven by motor 2.

The oxidant fluid is provided to the fermentation broth at a flow rate such that the total amount of oxygen provided to the fermentation broth is not more than 5 weight percent of the total amount of carbon dioxide produced and bubbled out of the fermentation broth. If the amount of oxygen provided into the fermentation broth were to exceed this defined upper limit, the viability and the optimal population of the culture in the fermentation broth would be compromised by depleting the carbonaceous substrate for yeast growth thus reducing the carbon dioxide yield in any subsequent fermentation stages which have no oxygen injection. Typically the oxygen provided to the fermentation broth is within the range of 0.05 to 5 weight percent of the total carbon dioxide produced, preferably within the range of from 0.1 to 4 weight percent of the total carbon dioxide produced, more preferably within the range of from 0.2 to 3 weight percent of the total carbon dioxide produced, and most preferably within the range of from 0.4 to 2 weight percent of the total carbon dioxide produced in all fermentation stages. Typically the flow rate of the oxygen into the fermentation broth for an ethanol fermentation process using yeast is within the range of from 0.0003 to 0.0015 vvm where vvm means the volume of gas per volume of fermentation fluid or fermentation broth in the vessel per minute.

The carbon dioxide and other gases within broth 20 bubble out of broth 20 and form a gas mixture 22 having a carbon dioxide concentration of at least 97.5 mole percent. Depending upon the process conditions, the carbon dioxide concentration of gas mixture 22 could exceed 98.5 mole percent and even exceed 99.5 mole percent. The oxygen concentration of the gas mixture 22 is generally not more than 1.0 mole percent, and typically is less than 0.5 mole percent. This very low oxygen concentration not only speaks to the efficiency of the process of this invention but also reduces or eliminates the fire hazards potential which is present with many conventional carbon dioxide production processes wherein volatile flammable organic compounds are present.

Gas mixture 22 is withdrawn from vessel 1 in piping 6, mixed with gas produced in later fermentation stages, and this total carbon dioxide produced is recovered as product carbon dioxide which may be used commercially as is or may undergo one or more further purification steps such as low temperature distillation or solvent absorption.

The fermentation of the carbonaceous materials is exothermic. The exothermic nature of fermentation can lead to such a heat buildup within the fermentation broth that the microbial growth rate and fermentation rate within the fermentation broth may decline. In order to avoid this decline in production, a fermentation broth cooling recirculation loop is employed. Referring back now to FIG. 1, fermentation broth is withdrawn from vessel 1 in stream 23, passed through valve 24 and as stream 25 to recirculation pump 7. Resulting pumped stream 26 is passed through heat exchanger 8 wherein it is cooled by indirect heat exchange with cooling fluid 30 such as water. Resulting cooled fermentation broth 9 is returned back into fermentation vessel 1 through main recirculation stream 27 and/or bypass recirculation stream 28 and bypass valve 29.

Figure 2:
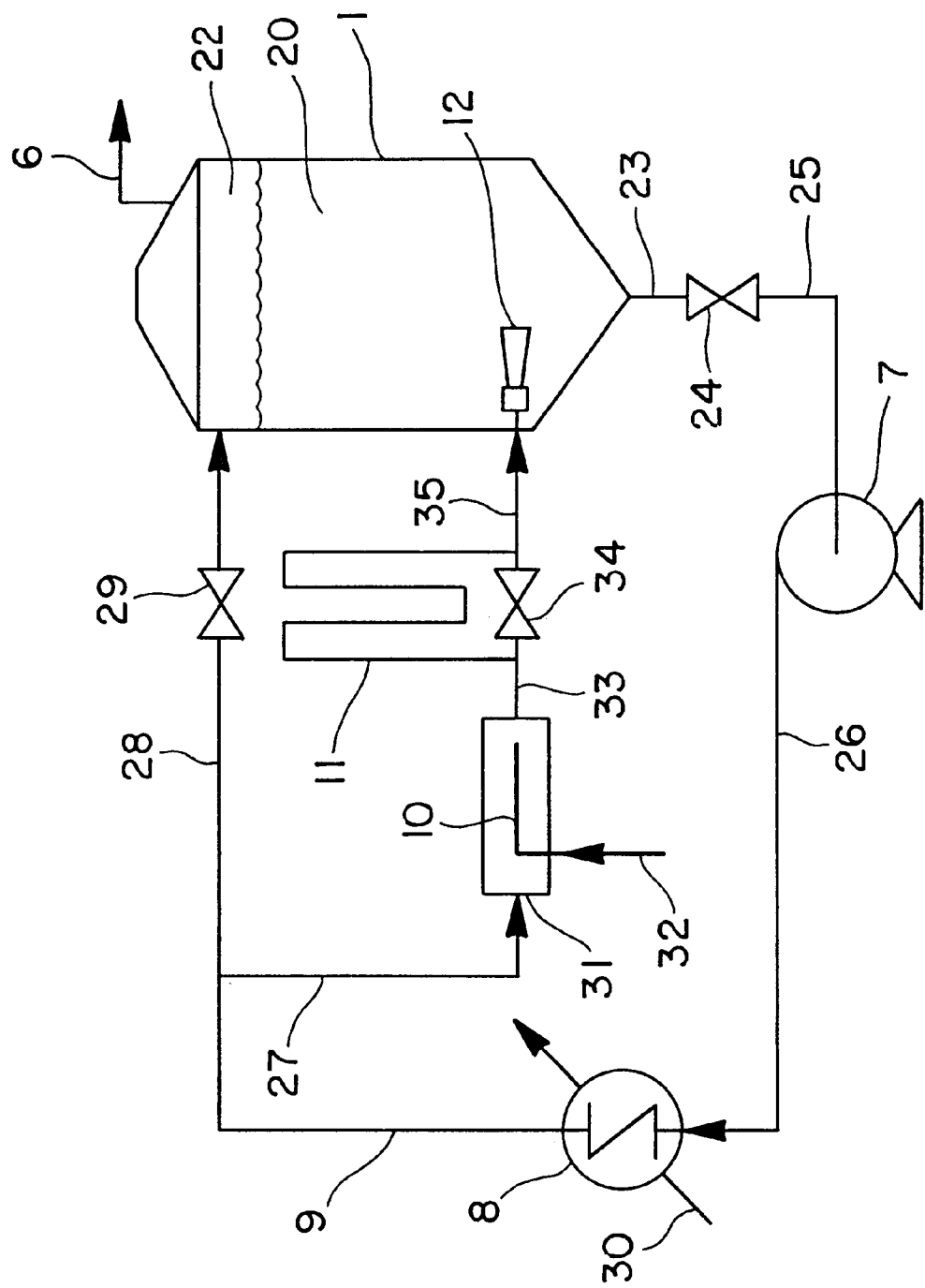
FIG. 2 is a simplified schematic representation of another preferred embodiment of the invention wherein the oxidant fluid is provided to the fermentation broth within a recirculation loop.

FIG. 2 illustrates another embodiment of the invention wherein the oxidant fluid is provided to the fermentation broth as it is passing through the recirculation loop. The numerals in FIG. 2 are the same as those for FIG. 1 for the common elements and these common elements will not be described again in detail.

Referring now to FIG. 2, cooled recirculation stream 27 is passed into receptacle 31 which houses fine bubble generation device 10. Device 10 could, for example, be a sintered metal fine bubble sparger/diffuser, a ceramic fine bubble diffuser, a membrane type bubble diffuser, a sonic-nozzle, a gas/liquid mixing nozzle, a venturi-type gas liquid mixing nozzle, an orifice plate or a gas/liquid flow restriction device. Oxidant fluid is passed in stream 32 into device 10 and is bubbled out into the fermentation broth within receptacle 31. The resulting oxygen-containing fermentation broth is withdrawn from receptacle 31 in stream 33. If desired, some or all of stream 33 may pass through gas/liquid contact loop 11 which serves to increase gas/liquid contact time and thus enhance the dissolution of the oxidant fluid into the fermentation broth. The remainder of stream 33, if any, is passed through valve 34 and then is mixed with the fluid, if any, from loop 11 to form stream 35 which is provided to diffuser 12 and out from diffuser 12 into the fermentation broth housed in vessel 1 where the bulk of the microbial growth and fermentation take place in the same manner as was previously described. Diffuser 12 can be any effective gas/liquid dispersing nozzle such as, for example, a liquid circulation eductor.

The high concentration of oxygen within the oxidant fluid in the practice of this invention serves to reduce the amount of inerts and residual oxygen passed into the fermentation vessel which will ultimately find their way into the carbon dioxide gas mixture product, thus serving to attain and maintain the carbon dioxide concentration at a beneficially high level. In addition, this high oxygen concentration serves to reduce the energy required to operate the fermentation plant, and, in addition, will reduce odor emissions from certain types of fermentation plants.

The following example is provided for illustrative purposes and is not intended to be limiting. Using an arrangement similar to that illustrated in FIG. 1, oxidant fluid, having an oxygen concentration of 99.5 mole percent was provided into the fermentation broth at a flow rate of typically from 0.0003 to 0.0015 vvm. The yeast species in the fermentation broth was *Saccharomyces cerevisiae* and the carbonaceous substrate within the fermentation broth was hydrolyzed saccharides from starchy material at a concentration of 17 to 20 weight percent. The fermentation temperature was 35° C. and the fermentation time was from 40 to 60 hours. The gas mixture bubbling out from the fermentation had a carbon dioxide concentration of 99.5 mole percent and passed out of the fermentation broth at a flow rate of from 100 to 160 $m^3$/minute where $m^3$ is measured at NTP conditions of 70° F. and 14.7 psia. The amount of oxygen provided and dissolved into the fermentation broth was from about 0.5 to 1 weight percent of the total amount of carbon dioxide produced in and bubbled out of the fermentation broth.

Although the invention has been described in detail with reference to certain preferred embodiments, those skilled in the art will recognize that there are other embodiments of the invention within the spirit and the scope of the claims.

What is claimed is:

1. A method for producing carbon dioxide comprising the following steps:
   (A) providing an oxidant fluid containing an oxygen concentration of at least 40 mole percent to a fermentation broth comprising one or more carbonaceous species;
   (B) employing oxygen from the oxidant fluid to promote microbial growth within the fermentation broth, carrying out fermentation within the fermentation broth, and producing carbon dioxide within the fermentation broth in a fermentation vessel;

(C) passing a fermentation broth stream out from the fermentation vessel, through a heat exchanger, and then back into the fermentation vessel in a recirculation loop;

(D) bubbling carbon dioxide out from the fermentation broth to form a gas mixture having a carbon dioxide concentration of at least 97.5 mole percent; and (E) recovering said gas mixture as product carbon dioxide, wherein said oxidant fluid is provided to the fermentation broth at a flow rate such that the amount of oxygen provided to the fermentation broth is not more than 5 weight percent of the amount of carbon dioxide produced.

2. The method of claim 1 wherein the oxidant fluid is provided to the fermentation broth while the broth is in the fermentation vessel.

3. The method of claim 1 wherein the oxidant fluid is provided to the fermentation broth while the broth is in the recirculation loop.

4. The method of claim 3 wherein the oxidant fluid is provided to the fermentation broth downstream of the heat exchanger.

5. The method of claim 4 wherein the fermentation broth is provided to a receptacle downstream of the heat exchanger, and the oxidant fluid is provided to the receptacle and diffused into the fermentation broth within the receptacle.

6. The method of claim 4 wherein at least some of the oxygen-containing fermentation broth is passed through a contact loop downstream of the heat exchanger prior to being passed back into the fermentation vessel.

7. The method of claim 1 wherein the fermentation comprises the fermentation of one or more carbohydrates by microorganisms to produce ethanol.

8. The method of claim 1 wherein the oxidant fluid has an oxygen concentration of at least 90 mole percent.

9. The method of claim 1 wherein the oxidant fluid has an oxygen concentration of at least 99.5 mole percent.

10. The method of claim 1 wherein the gas mixture has a carbon dioxide concentration of at least 98.5 mole percent.

11. The method of claim 1 wherein the gas mixture has a carbon dioxide concentration of at least 99.5 mole percent.

12. The method of claim 1 wherein the gas mixture has an oxygen concentration of not more than 1.0 mole percent.

13. The method of claim 1 wherein the gas mixture has an oxygen concentration less than 0.5 mole percent.

14. The method of claim 1 wherein substantially all of the oxygen provided to the fermentation broth is dissolved in the fermentation broth.

15. The method of claim 1 wherein the oxygen is provided to the fermentation broth at a flow rate within the range of from 0.0003 to 0.0015 vvm.

16. The method of claim 1 wherein the oxidant fluid is provided to the fermentation broth at a flow rate such that the amount of oxygen provided to the fermentation broth is within the range of from 0.4 to 2 weight percent of the total amount of carbon dioxide produced.

17. The method of claim 1 wherein the product carbon dioxide undergoes at least one further purification step.

18. The method of claim 17 wherein said at least one further purification step comprises distillation.

19. The method of claim 17 wherein said at least one further purification step comprises solvent absorption.

\* \* \* \* \*